Dec. 23, 1941.　　　G. E. WEIDNER　　　2,266,836
AUTOMATIC LOW PRESSURE VALVE
Filed Nov. 3, 1939　　　4 Sheets-Sheet 1

INVENTOR
GEORGE E. WEIDNER
BY
ATTORNEYS

Dec. 23, 1941.  G. E. WEIDNER  2,266,836
AUTOMATIC LOW PRESSURE VALVE
Filed Nov. 3, 1939  4 Sheets-Sheet 3

INVENTOR
GEORGE E. WEIDNER
BY Edgar H. Snodgrass
Wade Konitz
ATTORNEYS

Dec. 23, 1941.  G. E. WEIDNER  2,266,836
AUTOMATIC LOW PRESSURE VALVE
Filed Nov. 3, 1939   4 Sheets-Sheet 4

GEORGE E. WEIDNER, INVENTOR

BY

ATTORNEYS

Patented Dec. 23, 1941

2,266,836

UNITED STATES PATENT OFFICE 2,266,836

AUTOMATIC LOW PRESSURE VALVE

George E. Weidner, Dayton, Ohio

Application November 3, 1939, Serial No. 302,754

5 Claims. (Cl. 137—139)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in automatic pressure responsive valves and more particularly, is concerned with an improved valve for automatically equalizing the pressure difference existing between a balloon envelope, or a ballonet and the atmosphere.

A principal object of the invention is to provide an automatic valve for airships and the like, which will open upon a predetermined pressure difference being attained on opposite sides of the valve and in which a manually controlled means is provided for positively moving the valve in the closing direction and other manually controlled means are provided for positively closing the valve.

A further object is to provide improved automatic actuation of a valve, in which the force required to move the valve may increase, remain constant, or decrease, as the valve is moved in the opening direction.

A further object of the invention is the provision, in an automatic pressure responsive valve, of manual means to override the automatic actuating means and positively hold the valve in the fully open or closed positions.

Other objects will be apparent by reference to the drawings and the detailed description hereinafter given.

In airships such as balloons, either of the non-rigid, or rigid types, it is desirable to incorporate one or more valves, which automatically open upon a predetermined pressure difference between the inside of the gas filled envelope, or ballonet and the outside atmosphere, thereby limiting the gas pressure to a safe maximum value. Such valves are usually formed with an annular housing secured within an opening in the airship envelope, to the envelope material, such as fabric. The annular housing contains a port closed by a valve, normally held in the closed position by a yielding means, such as a spring. Upon the gas pressure acting on one side of the valve exceeding a predetermined value with reference to the pressure of the outside atmosphere, the force acting on the valve is sufficient to overcome the biasing force of the springs and the valve opens, allowing sufficient flow of gas from the airship envelope to reduce the pressure differential to a predetermined value, and upon the desired pressure difference being attained the spring will again close the valve.

In a valve of the type described it is desirable to have the biasing spring force opposing the valve opening vary in proportion to the valve movement in various ways. Where a rapid opening of the valve from the closed to substantially the fully open position is required, upon a given pressure difference acting on the valve, being attained, it is necessary to have the biasing spring force decrease as the valve opens allowing the valve to continue to move toward the full open position. Under other circumstances, it may be desired to have the force opposing valve movement remain constant, as the valve opening movement increases and it is thus necessary to regulate the spring force, so that the valve biasing force has a constant relation to valve movement. Further, it may be desired to have the force opposing the movement of the valve increase as the valve moves in the opening direction. The present invention accomplishes the above desired modes of operation by incorporating a variable leverage system between the valve and its biasing spring, or other yielding resistance means. The variable leverage system includes a cam, which can be so designed to give any desirable ratio of biasing spring force to valve opening movement. The cam, if desired, may be made with an adjustable contact surface instead of using a cam with a fixed, machined contour.

In valves of the character described, it is desirable to render the valve subject to manual control, so that the valve may be opened or closed at will and the invention provides means for accomplishing such a desired result.

In valves of the above described type the valves operate in response to pressure differences of only a few inches of water and consequently are of a comparatively large size and to reduce weight, must be constructed of thin light-weight materials, and it is essential to protect the valve and its operating mechanism from damage, when for instance, an observation balloon using such a valve is bedded down. To prevent such damage, the invention provides a valve arrangement, in which the major portion of the valve and its operating mechanism lies within the airship envelope and the bottom portion of the valve housing is substantially flush with the envelope outer boundary. To further protect the valve operating mechanism, a shield is provided a partially enclosing the lower portion of the valve casing and serving as a support for the valve when the same is in contact with the ground, or other objects.

A preferred form of the invention is illustrated in the accompanying drawings in which.

Figure 1:
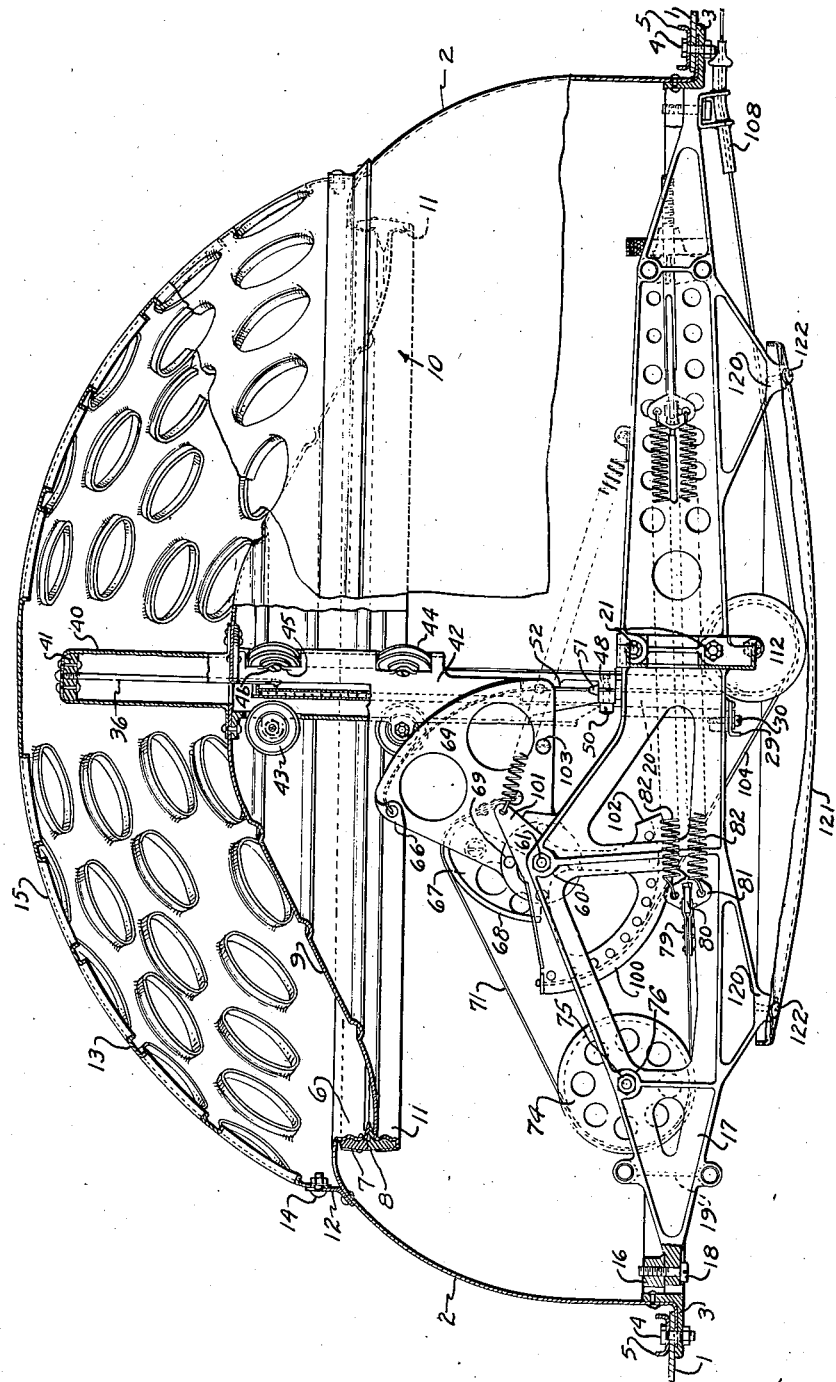
Fig. 1 is a side elevation taken along the line 1—1 of Fig. 2 and in which portions of the structure are shown in section.

Referring to Fig. 1, the numeral 1, represents a portion of a fabric airship envelope cut out for insertion of the automatic valve, only a portion of the envelope being shown. The automatic valve assembly is generally indicated by the numeral 10. The valve assembly 10, has a main annular valve casing 2, of dished concave form, open at the top and bottom and serving as a passage for gas from the balloon to the outside atmosphere. The lower portion of the casing 2 is flanged over and riveted to an annular flanged reinforcing ring 3, the flange of which serves as a means for attaching the valve to the airship envelope 1, in conjunction with bolts 4 and clamping ring 5. The upper open end of the valve casing 2 has an inwardly flanged portion 6, to which a flexible valve seat 7, of rubber, or like material, is bonded. A dome shaped valve 9, of thin sheet metal has an annular flanged peripheral recess 11, formed therein, which serves as a means for retaining an annular sealing ring 8, made of rubber, or like material and is suitably bonded to the flanged recess 11, of the valve 9. The valve 9, in conjunction with the sealing ring 8 and the valve seat 7, serves when closed to prevent the passage of gas through the open upper end of the casing 2, while the valve when lifted from its seat 7, permits the flow of gas through the open end of the valve casing 2 in an amount proportional to the valve opening. An annular flanged ring 12, is suitably secured by rivets adjacent to the upper portion of the valve casing 2, and to this ring, a thin dome shaped metal guard 13, is removably secured by means of bolts 14. The outer surface of the guard 13, is pierced by a large number of flanged openings 15, which serve to transmit the gas pressure from the interior of the airship envelope 1, to the upper side of the valve 9.

The annular ring 3 has diametrically opposed pairs of lugs 16, inwardly projecting therefrom, which serve as a mounting means for a pair of spaced frames 17, which extend in parallel relation transversely of the ring 3. The frames 17, are secured to the lugs 16, by means of cap screws 18. The frames 17 are preferably light aluminum alloy castings, or other suitable material is used and the frames are provided with suitable stiffening flanges and cut-out web portions giving a light, yet strong construction. The frames 17, are secured in assembled spaced relation by spacer blocks 19 and 19', to which the webs of the frames are bolted. Centrally located between the ends of the frames, there is a casting 20, which serves as a main supporting structure hereinafter described, and also as a frame spacer. The casting 20, is secured to the frames 17, by means of a pair of bolts 21, which also serve as a means to secure the inner ends of a pair of radially arranged, flanged bracing members 22 (see Fig. 4). The outer ends of the braces 22, are secured to lugs (not shown) but similar to lugs 16, heretofore described.

Figure 3:
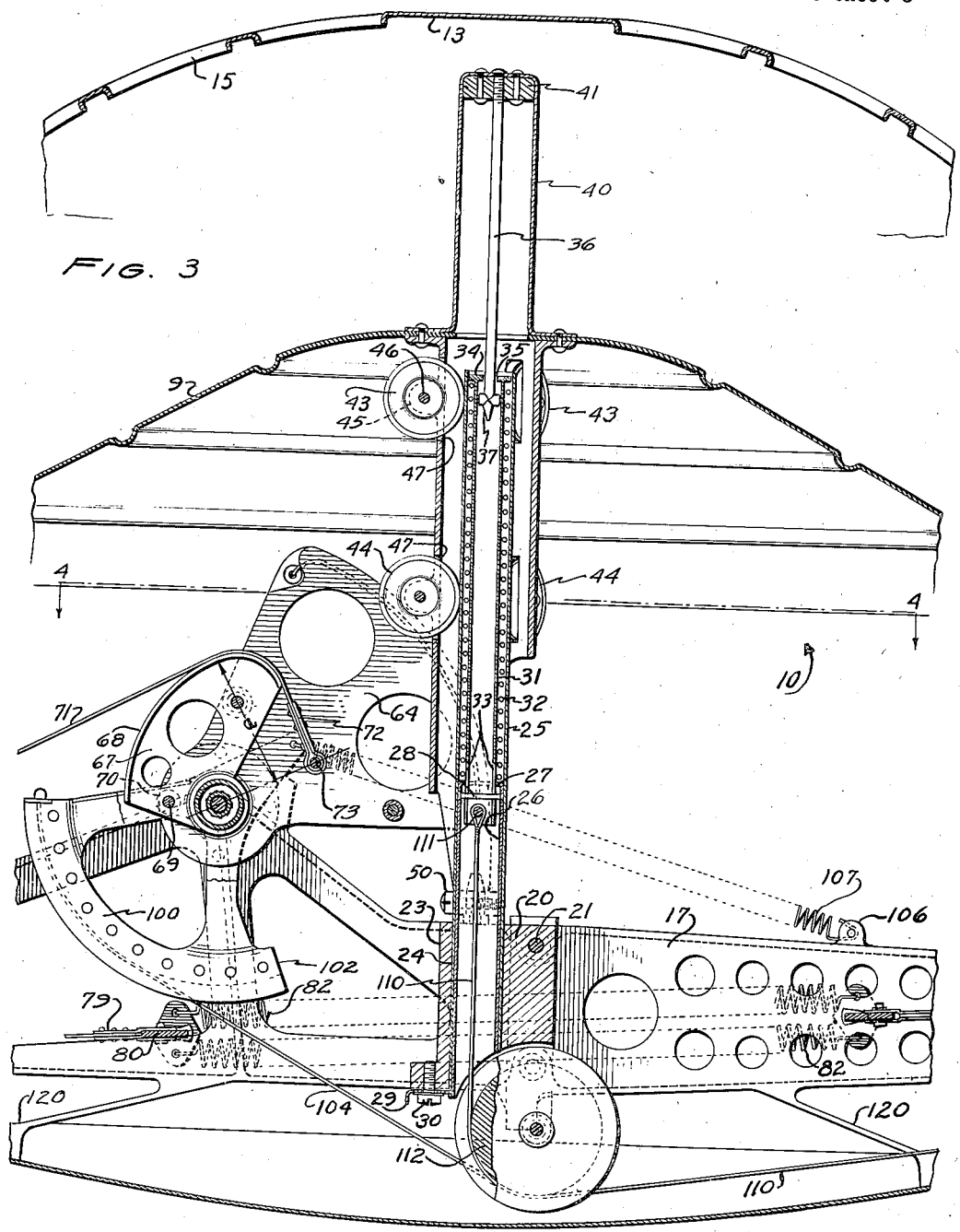
Fig. 3 is a sectional elevation of a portion of the valve and its operating structure taken substantially along the line 3—3 of Fig. 2.
Figure 4:
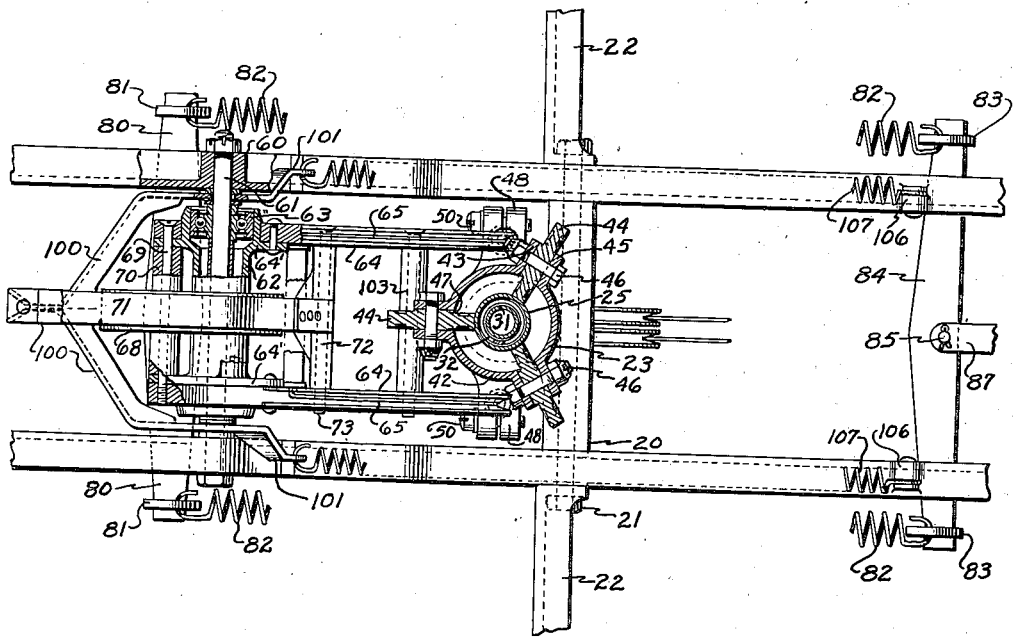
Fig. 4 is a sectional plan view taken along the line 4—4 of Fig. 3.

As shown in Figs. 3 and 4, the casting 20 has an enlarged hub portion 23, having a vertical bore 24, into which a tubular metal guide 25, is fitted and securely retained either by a press fit, or by threading, if desired. Within the lower portion of the guide tube 25, a short tube 26, is inserted having its upper end partially closed by a flanged over portion 27, which serves as an abutment for a spring 32, and permits a tubular member 31, to reciprocate therein. The tubular member 31, is provided with slots 33, adjacent its lower end, which cooperate with a pin 28, fixed transverse of tube 26 and which permits the tube 31, to reciprocate within the tube 26, within limits determined by the length of the slots 33. The pin 28 and slots 33, prevent any rotation of tube 31, relative to tube 26 and guide 25. The lower end of the tube 26 is provided with a bent-over ear 29, which is secured to the body of casting 20, by a cap screw 30 and the tube 26 is thus securely fixed against longitudinal and rotational movement, relative to the tubular guide 25. The tube 31, which is of smaller diameter than tube 26, as above described, has its upper end formed with an integral flanged head 34, of larger diameter than tube 31, but freely movable within the tubular guide 25. The upper end of the spring 32, engages the flanged head 34, of the tube 31, so that when the latter is moved downward the spring 32 is compressed. The flanged head 34, of the tube 33, is bored as at 35, allowing a rod 36 to pass therethrough. The rod 36, is formed at its lower end with an enlarged head 37, which permits the head 34 to move the rod 36, downward upon downward movement of tube 31.

Figure 2:
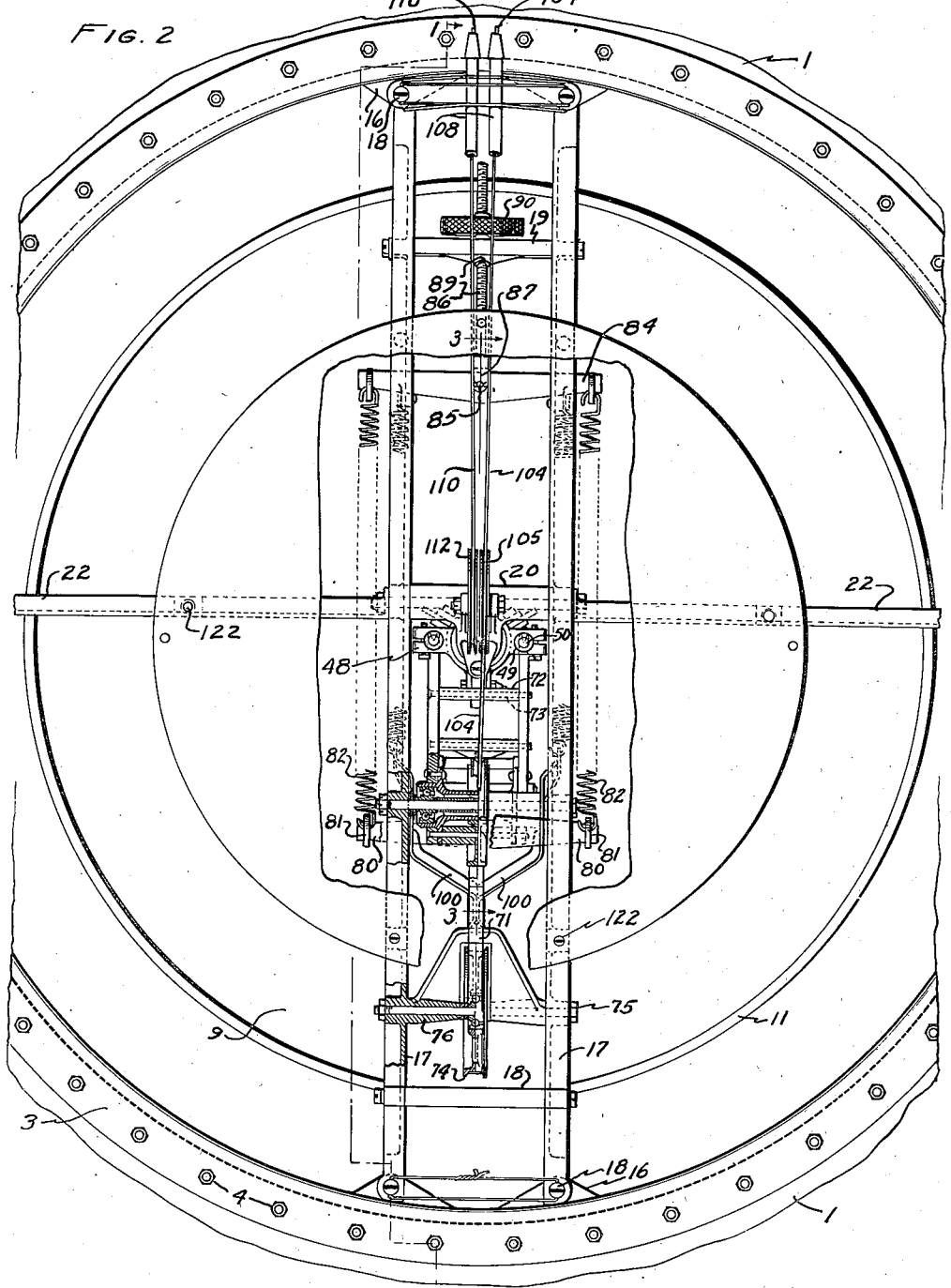
Fig. 2 is a bottom plan view with portions of the protecting shield broken away and certain parts shown in section.

The dome shaped valve 9, is arranged coaxial with the guide tube 25 and at its central portion, it is provided with a tubular extension 40, closed at its outer end by a plug 41, secured by rivets to the flanged end of the extension 40. The upper end of the rod 36, is threaded into the plug 41, so that rod 36, moves with the valve. On its under side and coaxial with the extension 40, the valve 9 is provided with a tubular guide frame casting 42, which has a flanged upper end secured to the valve 9, by rivets in common with those securing the extension 40. The guide frame 42, is concentric with the guide tube 25, and of considerably larger diameter and is provided with two sets of rollers, the upper set being indicated by numerals 43 and the lower set by numerals 44. Each set of rollers, as shown, comprise three rollers spaced equidistantly around the circumference of the guide frame 42 (see Fig. 4) and extend through slots 47, cut through the wall of the guide frame 42. Each guide roller is rotatably mounted on a bearing shaft 46, supported by a pair of ear projections 45, formed in the guide frame 42 (see Figs. 3 and 4). The guide rollers 43 and 44 are in rolling contact with the outer surface of the tubular guide 25 and permits the valve 9 and its guide frame to be reciprocated on the tubular guide 25, between its open and closed positions. The tubular extension 40, of the valve 9, permits the guide 25, to project into the extension 40, when the valve is moved downward, giving a construction permitting a maximum of valve travel in a minimum of space. As shown in Figs. 1, 2 and 3, the lower end of the guide frame 42, terminates in a pair of diametrically opposite slotted lugs 48, each having a tapered bore 49, for receiving a cable terminal fitting 51, clamped in place by a clamping screw 50. Each cable terminal 51, is secured to a cable 52, whose function will be later described. The line of action of the cable 52, at its terminal end 51, is substantially along the central axis of the guide 25.

The supporting frames 17 are provided with bearing bosses 60, which carry a bearing spindle 61 (see Fig. 4), which rotatably supports a hollow hub 62, provided with spaced ball bearings 63, only one of which is shown. The hub 62, is provided with a pair of spaced flanges 64', to each of which an arcuate sector plate 64, is secured by rivets or other fastening means. Each sector plate 64, has its outer peripheral surface cut with cable guide grooves 65, in which the cables 52 rest. The upper end of each cable 52, is secured in a cable terminal 66, formed at the end of the groove 65, of each sector plate 64. The sector plates 64 are spaced each side of the axis of guide 25 and guide frame 42, so that the guide frame can be reciprocated freely between the sector plates. A cam plate 67, is centrally, removably secured to sector plates 64, by means of spacers 70, and bolts 69. The outer surface of the cam plate 67, carries a flat cam surface element 68, over which a thin flexible metal band 71, is carried. The terminal 72, of the metal band 71, is rotatably mounted between the sector plates 64, by means of a transverse pin 73, thus transmitting movements of the sector plates to the metal band 71. The metal band 71, passes over a ball bearing type, grooved, guide pulley 74, rotatably mounted between the frame members 17 on a spindle 75 supported by bosses 76, cast integral with each frame member 17. The other end of the band 71 terminates in a forked fitting 79, connected to the middle of a transverse bar 80, movable parallel to the longitudinal axis of the frames 17 through openings therein, the ends of the bar 80 projecting on either side beyond the frame members 17. Each end of the bar 80 has secured thereto by a spring anchorage link 81, a pair of light tension springs 82, the opposite ends of which are secured by similar spring anchorage links 83, to the ends of a transverse bar 84. The transverse bar 84, is pivoted at its center by a clevis pin 85, to a threaded rod 86, having a forked clevis end 87, forming the pivotal connection to the bar 84. The threaded rod 86, passes through an opening 89, in the frame spacer 19, and has an adjustable nut 90, threaded on its outer end, which serves as a means to manually shift the bar 84 longitudinally and thus vary the tension of the springs 82.

*Automatic valve actuation*

The above described valve is automatically operable due to differential pressures in the following manner:

Assuming, that the airship is ascending, then the atmospheric pressure acting on the underside of the valve 9 is decreasing, while the gas pressure within the airship envelope decreases due to envelope expansion, at a lesser rate, thus setting up a pressure differential acting on the valve, which tends to cause the valve 9 to move downward in the opening direction. The force due to the pressure differential acting on the valve 9, is transmitted by means of the guide frame 42, to the cables 52, and sector plates 64, causing a turning moment about the hub axis 61, in a clockwise direction. This turning moment is transmitted by means of the flexible band 71, to the springs 82, which resist valve movement. When the force transmitted by the band 71 exceeds the initial spring loading, determined by the spring tension adjustment means 86, the valve will open allowing gas to escape and tending to equalize the difference in pressures between the airship envelope and the outside atmosphere. Upon the pressure difference dropping below a predetermined value the valve will close due to the loading of the springs 82. By reference to Fig. 3, it will be seen that a given force acting on the guide frame 42 will transmit a constant turning moment to the hub 66, about its axis 61, through cables 52, and sector plates 64, since the lever arm equals the radius of the cable grooves 65 in the sector plates 64. The force transmitted by the sector plates 64, to the metal band 71, and springs 82, is equal to the turning moment exerted by the valve due to differential pressures, on the plates 64, about the axis 61, divided by the perpendicular distance from the axis 61, to the point of tangency between the cam surface 68, of the cam plate 67 and the flexible band 71, and indicated in Fig. 3 as the dimension *a*.

If the cam surface 68 is cut so that the dimension *a* increases as the cam is rotated in a clockwise direction in Fig. 3, the force transmitted to the springs 82, will decrease, as the valve is displaced in the opening direction, causing in effect an increase in the effectiveness, or resistance of the springs 82, with increase of valve displacement in the opening direction. Thus, the rate of change of spring force compared with valve displacement, increases.

If the cam dimension *a*, remains constant as the cam rotates clockwise the force transmitted to the springs 82 will bear a constant relation to the valve displacement and the rate of change of spring force, with respect to increase of displacement of the valve in the opening direction, will remain constant.

If the cam face 68 is cut so that the cam dimension *a* decreases as the cam rotates clockwise, as seen in Fig. 3, the force transmitted to the springs 82, will increase, as the valve is displaced from the closed position and the effectiveness of the springs 82, in opposing valve movement decreases as the valve is displaced from the closed position. This formation of the cam surface 68, allows the valve upon opening to move rapidly in the opening direction and to give a large valve opening for a smaller increase in the pressure differential acting on the valve 9, above the predetermined value of the pressure differential determined by the initial loading of the springs 82.

Figure 5:
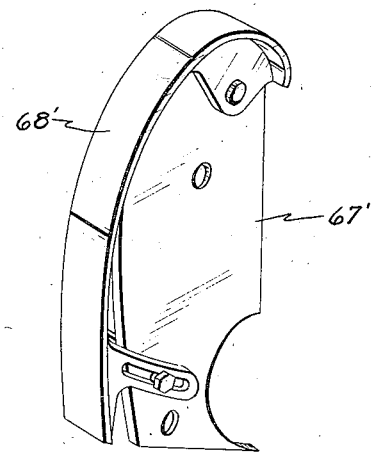
Fig. 5 is a view of a modified form of cam for use in the device illustrated in Fig. 1.

Thus, by suitably forming the cam surface 68, any desired relation between spring effectiveness and valve displacement may be achieved.

Where it is not desired to cut separate cams to adjust the relation of spring effectiveness to valve movement, as above described, the cam may be made in the manner shown in Fig. 5. In Fig. 5, the cam is made in two parts, the cam plate 67' being exactly similar to the cam plate 67, but the cam face portion 68' is shaped to a predetermined contour and made separable therefrom and pivoted at its upper end in any suitable manner to the plate 67', its lower end being adjustably clamped to the plate 67'. By shifting the cam face 68' relative to the cam plate 67', when substituted for the cam shown in Fig. 1, desired variations in the spring effectiveness with increased valve displacement may be obtained.

*Manual actuation of the valve*

As above noted, it is desirable to be able to manually operate the valve in both the opening and closing directions, and the structure for manually operating the valve in the closing direction will now be described:

As seen in Figs. 3 and 4, an arcuate forked sector plate 100, is pivotally mounted for rotation about the spindle 61 and the legs thereof straddle the hub 66 (see Fig. 4). The periphery of the sector plate is suitably grooved to act as a guide for a cable 104, which rests in the groove, one end of the cable being suitably secured to the sector plate 100, and movement of the cable will cause movement of the sector 100 about its axis. The forks of the sector plate 100 each terminate in the form of an arm 101, to which one end of a spring 107 is secured, the other end of the spring being secured to a lug 106, formed on each of the frame members 17. A stop member 103, is fixed between each of the sector plates 64 and engages with a stop portion 102, formed by one end of the arcuate portion of the sector plate 100. The cable 104 passes over a suitable guide pulley 105, suitably mounted on the casting 20, and the cable passes through one of a pair of cable fairleads 108 which are attached to the frames 17 and is suitably attached at its end to a manual control means, not shown.

Upon actuation of the cable 104 toward the right as seen in Fig. 1, the sector plate 100, will be rotated against the resistance of spring 107, until stop 102 engages stop 103, thereby rotating the sector plates 64 in a counterclockwise direction, as seen in Fig. 1, causing the cables 52 to elevate the guide frame 42 and moving the valve 9 upward until the valve sealing ring 8, engages the valve seat 7. Upon release of the tension in the cable 104, the tension in the springs 107 will return the sector plate 100 to a normal neutral position, with the stops 102 and 103 widely separated. The above described structure thus permits manual closing of the valve 9 at will.

The means for manually opening the valve 9 will now be described:

As described above with reference to the mounting structure of the valve, it is apparent that downward movement of the tube 31, with its head 34, against the resistance of spring 32, would cause the head 34 to engage the enlarged head 37 of the rod 36 after a certain amount of lost motion is taken up and the rod 36 in moving downward causes movement of the valve 9, in the opening direction. The tube 31 is caused to be moved downward at will, against the resistance of spring 32, by means of a cable 110, connected by means of a transverse pin 111, to the lower end of the tube 31. The cable 110 passes through the hollow tube 26 over a guide pulley 112, mounted parallel with the pulley 105 and rotatable about a common axis therewith, the pulleys being supported by the casting 20 in a similar manner. The line of tangency between the cable 110 and the pulley 112 is substantially coincident with the center line of tubes 25 and 26. The cable 110 passes through the other of the cable fairleads 108 and connects to a manual control device not shown. Movement of the cable 110 toward the right as seen in Fig. 1 causes tube 31 to be moved downward and causes valve 9 to be moved in the opening direction as above described, the spring 32 permitting the tube 31 to move upward, moving the heads 34 and 37 out of engagement, when the tension on cable 110 is released.

It is seen that the invention provides an automatic differential pressure operated balloon valve, in which at any time the automatic action of the valve may be superseded by manual control of the valve in either the opening or closing directions.

To protect the delicate valve and its operating structure from damage, where the valve is used in a location, where it is liable to strike the ground or floor of a balloon shed, each frame member 17 is provided with a downwardly extending pair of supports 120, to which a circular metal shield 121, is secured by screws 122. The shield 121, is also secured to the radial brace members 22 by screws 122. The diameter of the shield is less than the diameter of the bottom opening of the valve casing 2, allowing a free flow of gas past the shield. The entire valve assembly is mounted substantially within the airship envelope and only the shield 121 projects below the envelope outer surface. The valve 9 and its operating mechanism can easily be removed by removal of screws 18, without disturbing the valve casing 2, or dome guard 13.

While only one preferred form of the invention has been disclosed, other embodiments coming within the scope of the invention can obviously be constructed.

What I claim is:

1. An automatic pressure responsive valve for balloons and the like comprising, a valve casing, a port in said casing, a valve responsive to difference in pressure on opposite sides thereof for controlling fluid flow through said port, yielding means for opposing movement of said valve in one direction due to said difference in pressures, a hollow tubular guide mounted within said casing, said valve being reciprocably mounted on said guide, and manual operating means for said valve mounted at least in part within said tubular guide.

2. The structure as claimed in claim 1 wherein said tubular guide contains a slidable member, means on said member for engaging a portion of said valve for positively moving the valve in one direction, yielding means within the tubular guide for opposing the movement of the valve in said one direction and means for connecting said slidable member to said manually operating means.

3. An automatic pressure responsive valve for balloons comprising; a valve casing, a port in said casing, a valve in said casing for controlling fluid flow through said port and operable in response to a predetermined difference between gas pressure acting on one side and a varying atmospheric pressure acting on the opposite side of said valve, yielding means opposing movement of said valve in one direction, a pair of movable abutments each movable in response to the movement of said valve and operatively connected therewith, manually actuated means operable to engage one of said abutments to cause said valve to positively move in said one direction in opposition to said yielding means, other manually actuated means operable to engage the other of said abutments to cause said valve to positively move in the opposite direction from said one direction and yielding means associated with each respective one of said manually actuated means and respectively operative to restore the manually actuated means to an initial position out of engagement with the associated abutments.

4. An automatic valve for balloons comprising; a valve casing, a port in said casing, a reciprocably mounted valve for controlling fluid flow through said port and responsive to a predetermined difference between gas pressure acting on one side and atmospheric pressure acting on the opposite side thereof, yielding means opposing movement of said valve in one direction, due to said pressure difference, a first pivotally mounted lever, means connecting said lever and said valve, a cam secured to said lever and rotatable therewith, said cam having a varying lever arm with respect to the pivotal axis of said lever as the latter is rotated, a flexible band connected at one end to said lever and passing over said cam, the other end of said band being connected to said yielding means to transmit force thereto, a stop carried by said first lever, a second pivotally mounted lever, a stop carried by said second lever and arranged in the path of movement of said first named stop, yielding means for opposing movement of said second lever, and manual means for moving said second lever to engage said stops to thereby move said first lever in a direction to move said valve in the opposite sense to the said one direction.

5. An automatic valve for balloons comprising; a valve casing, a port in said casing, a reciprocably mounted valve for controlling fluid flow through said port and responsive to a predetermined difference between gas pressure acting on one side and atmospheric pressure acting on the opposite side thereof, yielding means opposing movement of said valve in one direction, due to said pressure difference, a pivotally mounted lever, means connecting said lever and said valve, a cam secured to said lever and rotatable therewith, said cam having a varying lever arm with respect to the pivotal axis of said lever as the latter is rotated, a flexible band secured at one end to said lever and passing over said cam, the other end of said band being connected to said yielding means to transmit force thereto, and manual means for moving said valve in the said one direction, said manual means including a spring for restoring the manual means to an initial neutral position and a lost motion connection between said manual means and said valve operable upon a predetermined movement of said manual means to positively move said valve.

GEORGE E. WEIDNER.